(12) United States Patent
Debates et al.

(10) Patent No.: US 10,028,221 B2
(45) Date of Patent: Jul. 17, 2018

(54) REDUCING ENERGY USAGE WITH A LOW POWER SENSOR CORE

(71) Applicant: Motorola Mobility LLC, Chicago, IL (US)

(72) Inventors: Scott Debates, Crystal Lake, IL (US); Brennan D Lautner, Round Lake, IL (US); Douglas A Lautner, Round Lake, IL (US); Jagatkumar Shah, Lake in the Hills, IL (US)

(73) Assignee: Motorola Mobility LLC, Chicago, IL (US)

( * ) Notice: Subject to any disclaimer, the term of this patent is extended or adjusted under 35 U.S.C. 154(b) by 42 days.

(21) Appl. No.: 14/987,090

(22) Filed: Jan. 4, 2016

(65) Prior Publication Data
US 2017/0195957 A1    Jul. 6, 2017

(51) Int. Cl.
*H04W 52/02* (2009.01)
*H04W 4/70* (2018.01)
*H04W 40/00* (2009.01)

(52) U.S. Cl.
CPC ......... *H04W 52/0222* (2013.01); *H04W 4/70* (2018.02); *H04W 52/0254* (2013.01); *H04W 40/005* (2013.01); *Y02D 70/00* (2018.01); *Y02D 70/142* (2018.01); *Y02D 70/144* (2018.01); *Y02D 70/166* (2018.01); *Y02D 70/26* (2018.01)

(58) Field of Classification Search
CPC ......... H04W 52/0222; H04W 52/0254; H04W 4/005; H04W 40/005
See application file for complete search history.

(56) References Cited

U.S. PATENT DOCUMENTS

| | | | |
|---|---|---|---|
| 8,421,588 B1* | 4/2013 | Ross | G08C 17/02 340/5.1 |
| 2013/0176107 A1* | 7/2013 | Dumas | G07C 9/00571 340/5.61 |
| 2014/0089243 A1* | 3/2014 | Oppenheimer | G06F 21/50 706/46 |

* cited by examiner

*Primary Examiner* — Wei Zhao (57) ABSTRACT

A computing device includes wireless sensor hardware that senses wireless signals from various wireless devices that are in close proximity to the computing device. The wireless signals are sensed by the wireless sensor hardware, which provides the data embedded in the sensed wireless signals to a host processor of the computing device or to a low power sensor core of the computing device. In a high power mode, the host processor is responsible for monitoring the data embedded in wireless signals sensed by the wireless sensor hardware. In the low power mode, the low power sensor core is responsible for monitoring the data embedded in wireless signals sensed by the wireless sensor hardware, thereby reducing power consumption by the computing device. The low power sensor core also optionally incorporate contextual awareness techniques to adjust the monitoring of wireless devices and reduce power consumption by the computing device.

20 Claims, 7 Drawing Sheets

FIG. 7

REDUCING ENERGY USAGE WITH A LOW POWER SENSOR CORE

BACKGROUND

As technology has advanced, people have become increasingly reliant upon a variety of different mobile devices, such as cellular or other wireless phones. While mobile devices offer a variety of different benefits, they are not without their problems. One such problem is that mobile devices are typically powered by batteries that need to be recharged. The more a mobile device is used to do different things, the greater the energy drain on the battery and the shorter the amount of time that will remain before the battery needs recharging. Needing to recharge the battery frequently, however, can lead to user dissatisfaction and frustration with their mobile devices.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

In accordance with one or more aspects, a computing device includes a host processor, a low power sensor core coupled to the host processor, wireless sensor hardware, and a multiplexer. The host processor is operative to configure, in response to determining that the host processor is to enter a low power mode, the multiplexer to route data from the wireless sensor hardware to the low power sensor core rather than the host processor. The low power sensor core is operative to receive data, via the multiplexer, from the wireless sensor hardware while the host processor is in the low power mode, and signal the host processor to enter a high power mode in response to detecting a trigger event.

In accordance with one or more aspects, a computing device includes a low power sensor core and a computer-readable storage medium having stored thereon multiple instructions that, responsive to execution by the low power sensor core, cause the low power sensor core to perform acts including: determining a context of the computing device, pausing scanning for a wireless beacon in response to the context of the computing device being still, pausing scanning for a wireless beacon in response to the context of the computing device being driving, adjusting a scanning duty cycle for a wireless beacon in response to the context of the computing device being walking, and adjusting the scanning duty cycle for a wireless beacon in response to the context of the computing device being running.

In accordance with one or more aspects, a method includes scanning, using wireless sensor hardware, for a wireless device. The method further includes determining, in response to a wireless device being detected, a wireless signal strength of the detected wireless device, and adjusting a wireless transmit power of the wireless sensor hardware based on the wireless signal strength of the detected wireless device, the adjusting including increasing the wireless transmit power in response to the wireless signal strength of the detected wireless device being in a low range, and decreasing the wireless transmit power in response to the wireless signal strength of the detected wireless device being in a high range.

BRIEF DESCRIPTION OF THE DRAWINGS

Embodiments of user interface adaptation based on detected user location are described with reference to the following drawings. The same numbers are used throughout the drawings to reference like features and components.

DETAILED DESCRIPTION

Reducing energy usage with a low power sensor core is discussed herein. A computing device includes wireless sensor hardware that senses wireless signals from various wireless devices that are in close proximity to the computing device. The wireless devices embed various data in the wireless signals, such as location data indicating the physical location of a wireless device, data indicating information sensed by a wireless device, and so forth. The wireless signals are sensed by the wireless sensor hardware, which provides the data embedded in the sensed wireless signals to a host processor of the computing device or to a low power sensor core of the computing device. The host processor or the low power sensor core that receives the data can then act on the data as appropriate, such as by the host processor making the information available to one or more programs of the computing device, by the low power sensor core activating the host processor, and so forth.

The computing device can run in a high power mode or a low power mode. In the high power mode, the host processor is responsible for monitoring the data embedded in wireless signals sensed by the wireless sensor hardware. In the low power mode, the low power sensor core is responsible for monitoring the data embedded in wireless signals sensed by the wireless sensor hardware. The host processor consumes more power when monitoring the data embedded in wireless signals sensed by the wireless sensor hardware than the low power sensor core (e.g., as a result of multiple processor cores in the host processor than in the low power sensor core, operation of the host processor at a higher clock speed than the low power sensor core, and so forth). By allowing the low power sensor core to be responsible for monitoring the data embedded in wireless signals sensed by the wireless sensor hardware, the amount of power consumed by the computing device in monitoring the data embedded in the wireless signals can be reduced.

When running in the low power mode, the low power sensor core monitors various information regarding the computing device to determine when the computing device is to transition to running in the high power mode. The low power sensor core, in response to determining that one or more trigger events have occurred, signals the host processor to transition the computing device to the high power mode. In response to such signaling, the host processor transitions the computing device to the high power mode. These transitions between high power mode and low power mode are discussed in additional detail below.

Additionally, techniques are discussed for using contextual awareness to adjust the monitoring of wireless devices. The context of a computing device can be determined, such as whether the computing device is Still, Walking, Running, Bicycling, or Driving. The rate at which scanning for wireless devices is performed can vary based on the context of the computing device, allowing reduced power consumption due to the rate at which scanning is performed being reduce. Additionally, the transmit power of wireless sensor hardware in the computing device can vary based on the context of the computing device, allowing reduced power consumption due to the reduced transmit power being reduced.

Figure 1:
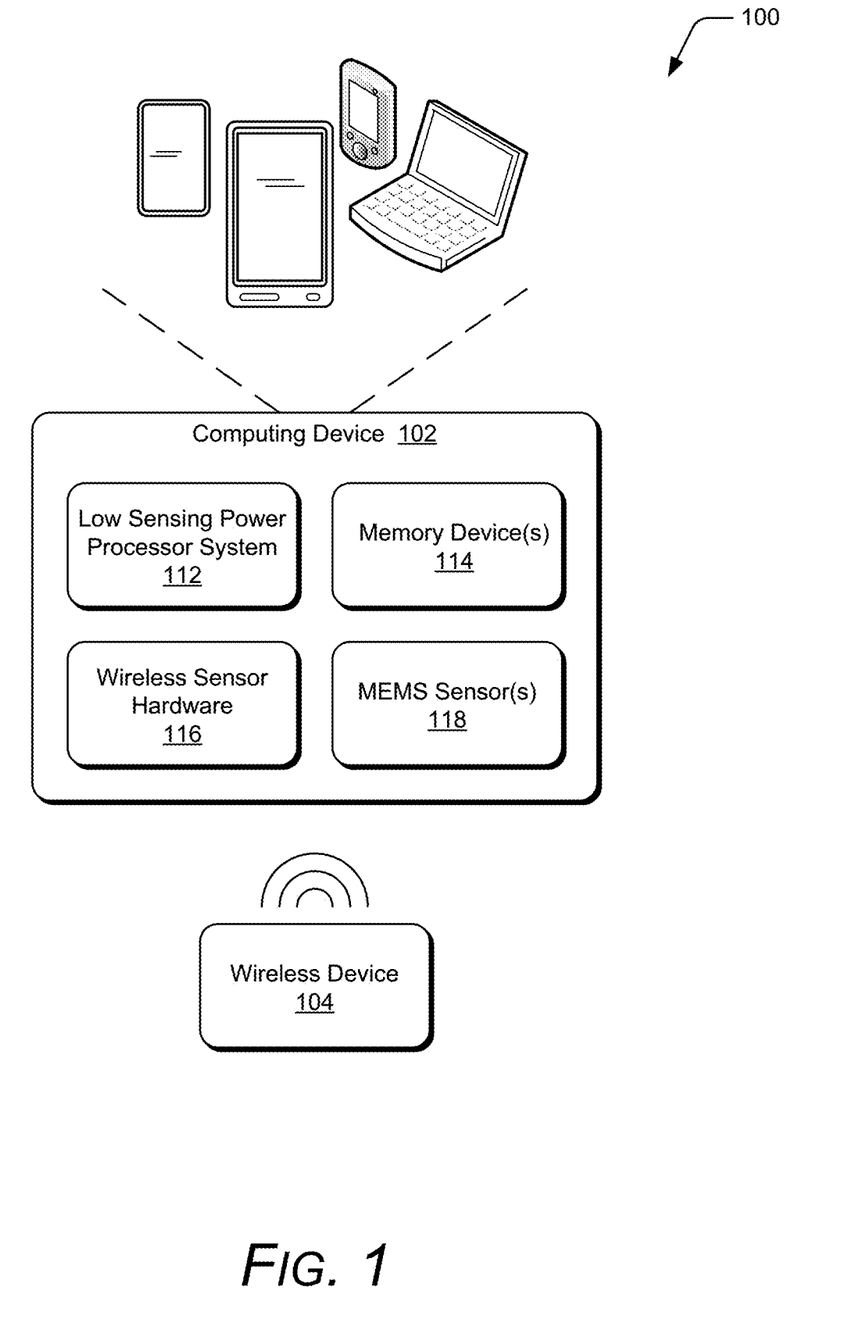
FIG. 1 illustrates an example system implementing the reducing energy usage with a low power sensor core discussed herein in accordance with one or more embodiments.

FIG. 1 illustrates an example system 100 implementing the reducing energy usage with a low power sensor core discussed herein in accordance with one or more embodiments. The system 100 includes a computing device 102 and a wireless device 104 that communicates data to the computing device 102. Although a single wireless device 104 is illustrated in FIG. 1, it should be noted that any number of wireless devices 104 can communicate data to the computing device 102.

The computing device 102 can be any of a variety of different types of electronic devices, such as a laptop computer, a desktop computer, a cellular or other wireless phone, a tablet or phablet device, a television or other entertainment device, an audio and/or video playback device, a wearable device (e.g., eyeglasses, watch, other jewelry, etc.), a gaming device, and so forth. The computing device 102 can be a device intended to be moved during use (e.g., a mobile device such as a wireless phone, tablet computer, etc.) or a device intended to remain stationary during use (e.g., a desktop computer, a television, etc.).

The wireless device 104 can be any of a variety of different types of devices that provide data to the computing device 102, such as a beacon, a sensor, an Internet of Things (IoT) device, and so forth. For example, the wireless device 104 may be a beacon that transmits a location or uniform resource locator (URL), a sensor worn by a user that senses fitness or medical information (e.g., heart rate), a sensor that detects information regarding the environment in which the sensor is placed (e.g., a carbon monoxide detector, a thermostat), and so forth. The wireless device 104 can communicate data wirelessly to the computing device 102 using any of a variety of different communication protocols, such as Bluetooth®, Bluetooth® Low Energy (BLE), Radio-Frequency Identification (RFID), Near Field Communication (NFC), Wi-Fi, and so forth.

The computing device 102 includes a low sensing power processor system 112, one or more memory devices 114, wireless sensor hardware 116, and one or more Microelectromechanical Systems (MEMS) sensors 118. The low sensing power processor system 112 includes both a host processor and a low power sensor core, the host processor consuming more power when running than the low power sensor core. The processor system 112 can run in a high power mode or a low power mode. In the high power mode, the host processor is responsible for monitoring the data embedded in wireless signals sensed by the wireless sensor hardware 116 and communicating with the wireless sensor hardware 116. In the low power mode, the low power sensor core is responsible for monitoring the data embedded in wireless signals sensed by the wireless sensor hardware 116 and communicating with the wireless sensor hardware 116, reducing power usage of the computing device 102.

The one or more memory devices 114 can be any of a variety of types of memory devices that enable data storage, such as random access memory, nonvolatile memory (e.g., read only memory, flash memory, erasable programmable read only memory, electrically erasable programmable read only memory, etc.), a disk storage device, and so forth. The wireless sensor hardware 116 includes various hardware components configured to receive wireless signals transmitted by the wireless device 104. The makeup of these hardware components can vary based on the communication protocol being used by the wireless device 104 to transmit data.

The MEMS sensors 118 are various different types of sensors that detect motion, movement, direction, and so forth. The MEMS sensors 118 can include, for example, an accelerometer, a gyroscope, a magnetometer, and so forth.

The system 100 supports a variety of different usage scenarios. For example, a user may be carrying the computing device 102 through a store or other indoor location, and the computing device 102 receives data (e.g., location information) from wireless beacons that are placed throughout the store or other indoor location. By way of another example, a user may be carrying the computing device 102 while walking, running, or bicycling, and the computing device 102 receives heart rate data from a wireless heart rate sensor. By way of yet another example, a user may have the computing device 102 while at home, and the computing device 102 receives data regarding carbon monoxide levels from a wireless carbon monoxide detector in the user's home.

In one or more embodiments the techniques discussed herein can be implemented as a computer-readable storage medium having computer readable code stored thereon for programming a computing device (for example, a processor of a computing device) to perform a method as discussed herein. Computer-readable storage media refers to media and/or devices that enable persistent and/or non-transitory storage of information in contrast to mere signal transmission, carrier waves, or signals per se. Computer-readable storage media refers to non-signal bearing media. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory.

Figure 2:
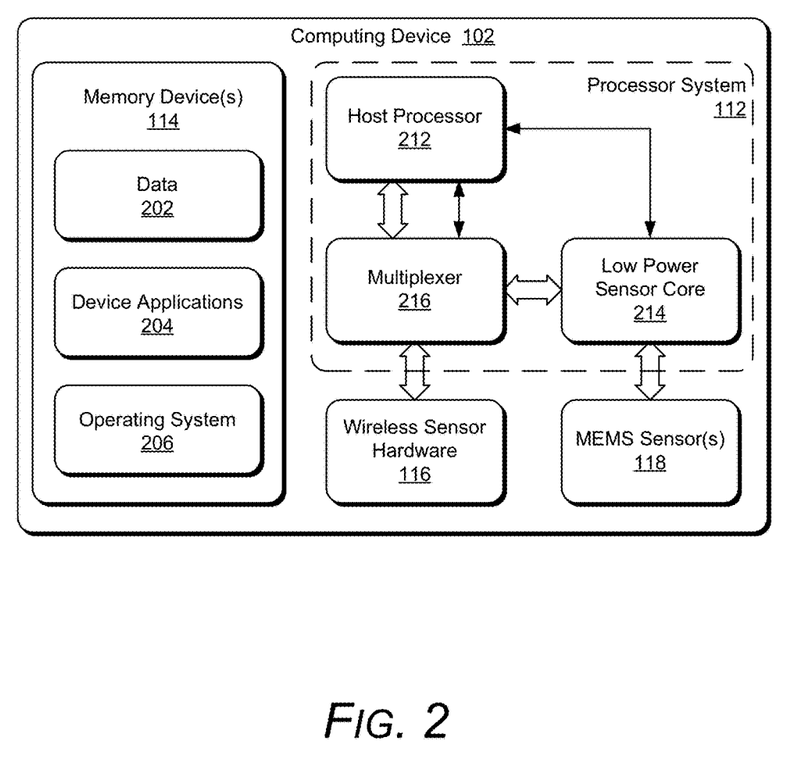
FIG. 2 illustrates an example computing device in additional detail.

FIG. 2 illustrates an example computing device 102 in additional detail. A memory device 114 provides data storage mechanisms to store data 202, including device data and/or other types of information or data (e.g., data backed up from other devices), and various device applications 204 (e.g., software applications). For example, an operating system 206 can be maintained as software instructions within a memory device 114 and executed by the processor system 112.

The processor system 112 includes a host processor 212, a low power sensor core 214, and a multiplexer (mux) 216. Although illustrated as separate from the processor system 112, it should be noted that a memory device 114 can be included at least partially in the processor system 112 (e.g., as a cache or other memory in the host processor 212 or the low power sensor core 214).

The host processor 212 performs the primary functions of computing device 102, executing most of the device applications 204 and operating system 206. The host processor 212 is higher performance than the low power sensor core 214. For example, the host processor 212 may include multiple cores (e.g., two cores, four cores, eight cores, etc., whereas the low power sensor core 214 is a single core), the cores of the host processor 212 may operate at a faster speed (e.g., 2 Gigahertz (GHz) as opposed to a speed of 90 Megahertz (MHz) for the low power sensor core 214), and so forth. However, the host processor 212 consumes more energy than the low power sensor core 214.

Either the host processor 212 or the low power sensor core 214 can be responsible for monitoring the data embedded in wireless signals sensed by the wireless sensor hardware 116. In a high power mode the host processor 212 is responsible for monitoring the data embedded in the wireless signals whereas in the low power mode the low power sensor core 214 is responsible for monitoring the data embedded in the wireless signals. By having the low power sensor core 214 monitor the data embedded in the wireless signals, less power is used by the processor system 112 to monitor the data embedded in the wireless signals than if the host processor 212 were responsible for monitoring the data embedded in the wireless signals. In the low power mode, the host processor 212 transfers its responsibility for executing one or more device applications 204 and/or portions of operating system 206 that monitor the data embedded in the wireless signals to the low power sensor core 214. The low power sensor core 214 also, in response to one or more trigger events, indicates to the host processor to resume responsibility for monitoring the data embedded in the wireless signals. In response to such an indication, the processor system 112 returns to the high power mode by the host processor 212 resuming responsibility for executing one or more device applications 204 and/or portions of operating system 206 that monitor the data embedded in the wireless signals.

The wireless sensor hardware 116 senses wireless signals from wireless devices as discussed above. Data is embedded in these wireless signals, and the wireless sensor hardware 116 extracts the embedded data and provides the extracted data to the multiplexer 216. The multiplexer 216 is configured (e.g., in response to a control signal received from the host processor 212) to route the extracted data to either the host processor 212 or the low power sensor core 214. In the low power mode, the multiplexer 216 is configured to route the extracted data to the low power sensor core 214. However, in the high power mode, the multiplexer 216 is configured to route the extracted data to the host processor 212. The multiplexer 216 is illustrated as a standalone multiplexer (e.g., an integrated circuit (IC)) that is separate from the host processor 212, the low power sensor core 214, and the wireless sensor hardware 116. Alternatively, the multiplexer 216 can be embedded in the host processor 212, the low power sensor core 214, or the wireless sensor hardware 116.

The host processor 212 determines when the processor system 112 is to enter the low power mode. In general, the host processor 212 determines that the processor system 112 is to enter the low power mode in response to a program (e.g., a device application 204 or part of the operating system 206) desiring to receive data from a wireless device but the wireless device is not currently in use by a program of the computing device 102. A program indicates a desire to receive data from a wireless device in a variety of different manners, such as by registering to receive data from the wireless device (e.g., location data from a wireless beacon, sensed data from a wireless sensor, and so forth). A wireless device is in use by a program of the computing device 102 if the computing device 102 is currently within wireless communication range of the wireless device and a program of the computing device 102 is currently sending data to and/or receiving data from the wireless device (or has sent data to and/or received data from the wireless device within a threshold amount of time, such as 30 seconds).

In response to determining that the processor system 112 is to enter the low power mode, the host processor 212 configures the low power sensor core 214 with various parameters regarding monitoring data embedded in wireless signals from the wireless device and communicating with the wireless sensor hardware 116. These parameters can include, for example, information indicating how to communicate with the wireless device and extract data embedded in the wireless signals, security parameters established by the host processor 212 with the wireless device (e.g., when pairing the computing device 102 with the wireless device), and so forth. In one or more embodiments, prior to determining to enter the low power mode, the host processor 212 has already established communication with the wireless device. The host processor 212 provides various configuration parameters to the low power sensor core 214 to allow the low power sensor core 214 to communicate with the wireless device as if the low power sensor core 214 were the host processor 212. Any parameters used by the host processor 212 in communicating with the wireless device can be passed to the low power sensor core 214.

In addition to parameters regarding monitoring data embedded in wireless signals from the wireless device, the host processor 212 configures the low power sensor core 214 with parameters regarding when the low power sensor core 214 is to signal the host processor 212 to return to the high power mode. These parameters identify one or more trigger events, the occurrence of which cause the low power sensor core 214 to signal the host processor 212 to return to the high power mode. Various different trigger events can be identified, such as trigger events based on data detected from a MEMS sensor 118 (e.g., a distance traveled, a change in direction), a particular location or URL being included as data embedded in a wireless signal received by the wireless sensor hardware 116, a particular amount of data having been received (e.g., from the wireless device, from a MEMS sensor 118), and so forth.

The host processor 212, after providing the various parameters to the low power sensor core 214, configures the multiplexer 216 to route data to the low power sensor core 214 rather than the host processor 212. Additionally, after providing the various parameters to the low power sensor core 214, the host processor 212 signals the low power sensor core 214 that the processor system 112 is entering the low power mode. This signaling can be performed in various manners, such as asserting a particular value on a control line (e.g., an interrupt) coupling the host processor 212 and the low power sensor core 214, setting a register value in the low power sensor core 214, and so forth. In response to the signal that the processor system 112 is entering the low power mode, the low power sensor core 214 begins monitoring the data embedded in wireless signals detected by the wireless sensor hardware 116. As the host processor 212 is no longer monitoring the data embedded in the wireless signals, the host processor 212 can optionally enter a sleep state or other operational state in which the host processor 212 is consuming little, if any, power (and optionally is not executing any instructions).

In the low power mode, the low power sensor core 214 monitors the data embedded in wireless signals detected by the wireless sensor hardware 116, monitors data received from one or more MEMS sensors 118, and determines whether the one or more trigger events identified by the host processor 212 have occurred. The low power sensor core 214 communicates with wireless devices and the wireless sensor hardware 116 using the parameters provided by the host processor 212. At some point in time, the processor system 112 can (and typically does) return to the high power mode.

In one or more embodiments, the processor system 112 returns to the high power mode in response to various different events. One such event is the occurrence of a trigger event as detected by the wireless sensor hardware 116. The low power sensor core 214, in response to detecting a trigger event, signals the host processor 212 that the trigger event has occurred. This signaling can be performed in various manners, such as asserting a particular value on a control line (e.g., an interrupt) coupling the host processor 212 and the low power sensor core 214. In response to the signal that the trigger event has occurred, the host processor 212 begins operations for the host processor 212 to resume responsibility for monitoring data embedded in the wireless signals. In one or more embodiments, if the host processor 212 is in a sleep state while the processor system 112 is in the low power mode, the signal that the trigger event has occurred operates to wake up the host processor 212.

Another event that can cause the processor system 112 to return to the high power mode is the occurrence of an external event (some event external to the operation of low power sensor core 214). Such an external event can be, for example, a display of the computing device 102 being turned on, any action causing the host processor 212 to wake from a sleep mode, and so forth. In response to such an external event, the host processor 212 determines that the processor system 112 is to return to the high power mode because the host processor 212 will already be consuming power performing other operations. In response to the occurrence of the external event, the host processor 212 begins operations for the host processor 212 to resume responsibility for monitoring data embedded in the wireless signals.

The operations for the host processor 212 to resume responsibility for monitoring data embedded in the wireless signals include the host processor 212 signaling the low power sensor core 214 that the processor system 112 is entering the high power mode. This signaling can be performed in various manners, such as asserting a particular value on a control line (e.g., an interrupt) coupling the host processor 212 and the low power sensor core 214, setting a register value in the low power sensor core 214, and so forth. In response to the signal that the processor system 112 is entering the high power mode, the low power sensor core 214 completes any tasks it is currently performing (e.g., any communications with the wireless sensor hardware 116), and stores data to be returned to the host processor 212 in one or more registers of the low power sensor core 214. The data stored can be data received from the wireless sensor hardware 116, data received from one or more MEMS sensors 118, and so forth. The data that is stored can also be the result of analysis or processing by the low power sensor core 214, such as an average of data values received from the wireless sensor hardware 116 and/or a MEMS sensor 118, a count of data values received from the wireless sensor hardware 116 and/or a MEMS sensor 118, high and/or low data values received from the wireless sensor hardware 116 and/or a MEMS sensor 118, and so forth.

The low power sensor core 214, after completing any tasks it is currently performing and storing data to be returned to the host processor 212 in one or more registers of the low power sensor core 214, signals the host processor 212 that the low power sensor core 214 is ready to enter the high power mode. This signaling can be performed in various manners, such as asserting a particular value on a control line (e.g., an interrupt) coupling the host processor 212 and the low power sensor core 214. The low power sensor core 214 also optionally sets a status flag in a register of the low power sensor core 214 indicating that the low power sensor core 214 has completed any tasks it is currently performing and stored the return data in an appropriate register. The host processor 212 can check this status flag in response to receiving the signal (e.g., an interrupt) from the low power sensor core 214 to verify that the low power sensor core 214 is ready to enter the high power mode.

In response to the signal from the low power sensor core 214, the host processor 212 optionally checks the status flag, and proceeds with operations to enter the high power mode. These operations include reading the return data from one or more registers of the low power sensor core 214, and providing the return data to whatever program or application desires the data. The host processor 212 also configures the multiplexer 216 to route data to the host processor 212 rather than the low power sensor core 214. At this point, the processor system 112 is in the high power mode, and the host processor 212 is monitoring the data embedded in wireless signals detected by the wireless sensor hardware 116.

In one or more embodiments, data communicated between the host processor 212 and the low power sensor core 214 is encrypted. This data includes, for example, the parameters of the low power sensor core 214 that are set by the host processor 212, return data provided to the host processor 212 from the low power sensor core 214, and so forth. The encryption is performed using a shared secret key that can be hardwired into the host processor 212 and the low power sensor core 214, or alternatively that can be arranged (e.g., at the time of booting the computing device 102) using any of a variety of public and/or proprietary key exchange algorithms. Alternatively, the encryption can be performed using public/private key pairs of the host processor 212 and the low power sensor core 214.

For example, the host processor 212 may establish a pairing with a wireless device (e.g., a Bluetooth® device), which includes pairing credentials used by the host processor 212 and the wireless device to securely communicate with one another. The host processor 212 encrypts these pairing credentials with the shared secret key (shared by the host processor 212 and the low power sensor core 214) and associates the encrypted credentials with the an identifier of the wireless device. The identifier of the wireless device allows the wireless device to be uniquely identified among the multiple wireless devices with which the computing device 102 may communicate. The host processor 212 communicates the identifier of the wireless device to the low power sensor core 214, which stores the identifier into a memory of the low power sensor core 214 (e.g., a random access memory). In response to the processor system 112 subsequently being in the low power mode and the low power sensor core 214 finding a wireless device (e.g., receiving wireless signals from a wireless device) that the low power sensor core 214 has an identifier for, the low power sensor core 214 wakes the host processor 212 and queries the host processor 212 for the encrypted credentials associated with the identifier. The host processor 212 returns the encrypted credentials associated with the identifier to the low power sensor core 214, which proceeds to decrypt the credentials and pair with the wireless device using the decrypted credentials. Alternatively, the host processor 212 may provide the encrypted credentials to the low power sensor core 214 for storage in memory of the low power sensor core 214 (e.g., random access memory), avoiding the need to query the host processor for the encrypted credentials when an identifier is found.

Figure 3:
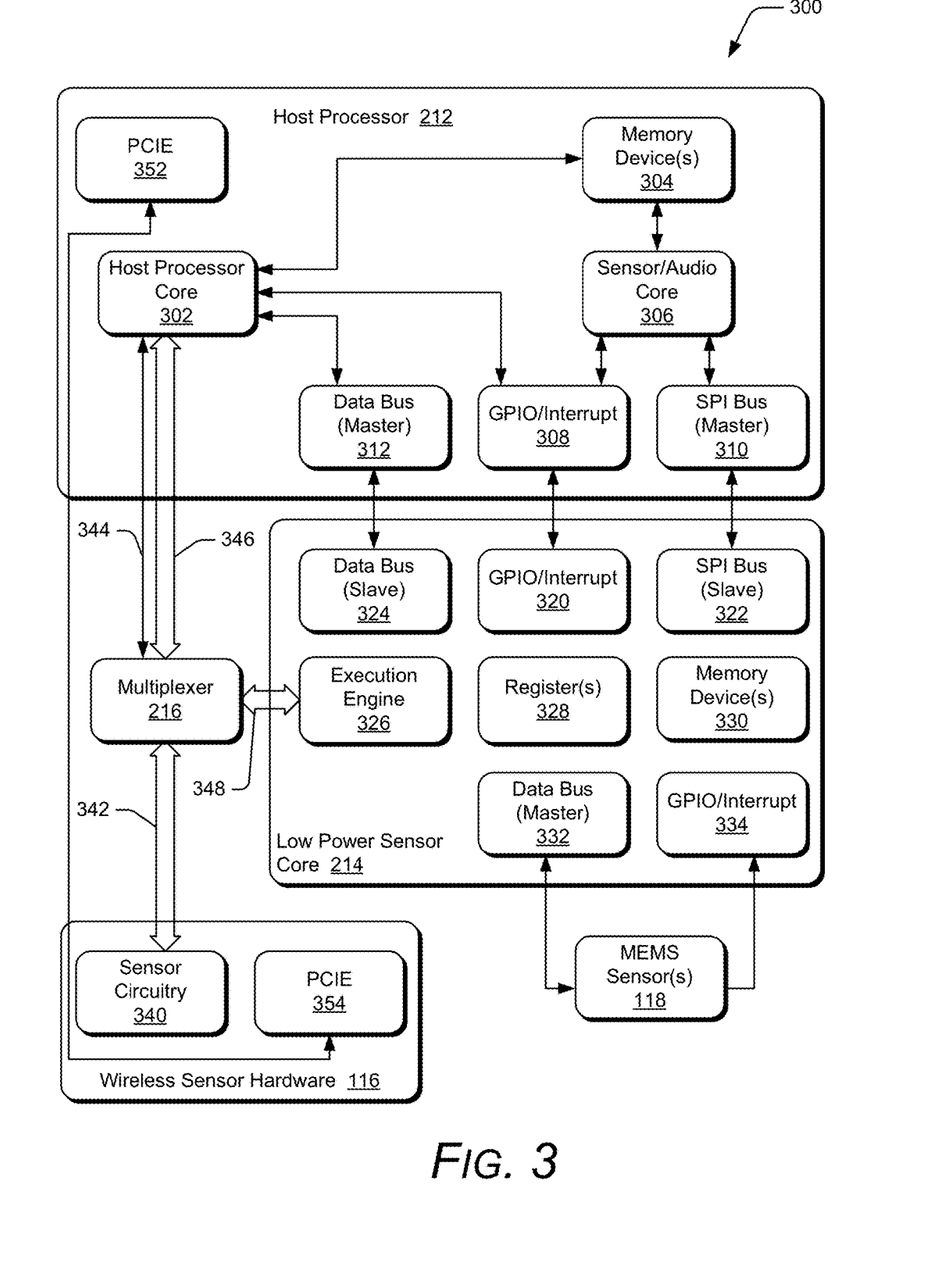
FIG. 3 illustrates components of an example computing device in accordance with one or more embodiments.

FIG. 3 illustrates components of an example computing device 300 in accordance with one or more embodiments. The computing device 300 can be, for example, a computing device 102 of FIG. 1 or FIG. 2, and vice versa. The example computing device 300 illustrates the host processor 212 and the low power sensor core 214 in additional detail.

The host processor 212 includes a host processor core 302, one or more memory devices 304, a sensor/audio core 306, a general purpose input/output (GPIO)/interrupt component 308, a serial peripheral interface (SPI) master component 310, and a data bus master component 312. The low power sensor core 214 includes a GPIO/interrupt component 320, an SPI slave component 322, a data bus slave component 324, an execution engine 326, one or more registers 328, one or more memory devices 330, a data bus master component 332, and a GPIO/interrupt component 334.

The host processor core 302 represents one or more cores of the host processor 212. Sensor circuitry 340 of the wireless sensor hardware 116 receives wireless signals from one or more wireless devices. Data embedded in the wireless signals sensed by the sensor circuitry 340 is provided to the multiplexer 216 via the data bus 342. A control line 344 allows the host processor core 302 to configure the multiplexer 216 to route the data on the data bus 342 to the host processor core 302 via a data bus 346, or to the execution engine 326 via a data bus 348. Additional communication between the host processor 212 and the wireless sensor hardware 116 (e.g., to establish pairing credentials) can be made via any of a variety of different types of data buses, such as a peripheral component interconnect express (PCIE) data bus, shown as PCIE component 352 of host processor 212 and PCIE component 354 of wireless sensor hardware 116.

The data bus components 312 and 324 are any of a variety of different types of data buses, such as an Inter-integrated Circuit (PC) data bus. Data, such as parameters that the host processor 212 provides to the low power sensor core 214 and return data that the low power sensor core 214 provides to the host processor 212, can be passed between the host processor 212 and the low power sensor core 214 via the data bus components 312 and 324.

Signals (e.g., interrupts) can be sent between the host processor 212 and the low power sensor core 214 using the GPIO/interrupt components 308 and 320. These signals can be signals indicating that processor system is to enter the low power mode, that the trigger event has occurred, and so forth.

A memory device 330 is any of a variety of memory devices, such as random access memory, and can be at least part of memory devices 114 discussed above. The memory device 330 stores instructions of one or more programs or applications that are executed by the execution engine 326 to monitor the data embedded in the wireless signals while the processor system is in the low power mode. Additional information, such as wireless device identifiers, can optionally be stored in a memory device 330.

The one or more registers 328 store various parameters, status or flag values, and data. The one or more registers 328 can store, for example, parameters that the host processor 212 provides to the low power sensor core 214, data to be returned to the host processor 212 by the low power sensor core 214, a status flag indicating that the low power sensor core 214 has completed any tasks it is currently performing and stored the return data in an appropriate register, and so forth.

The data bus master component 332 communicates configuration data or settings to each of one or more MEMS sensors 118, which provide data sensed by the MEMS sensors 118 to the GPIO interrupt 334. These data can be returned to the host processor 212 by the low power sensor core 214, or used by the low power sensor core 214 to determine when to return to the high power mode.

A memory device 304 is any of a variety of memory devices, such as random access memory, and can be at least part of memory devices 114 discussed above. Sensor data (e.g., obtained by the low power sensor core 214 from the MEMS sensors 118) is passed to the host processor 212 and stored in a memory device 304. The sensor data is passed to the host processor 212 via any of a variety of different types of data buses, such as an SPI data bus, shown as SPI components 310 and 322. The passed data is received by the sensor/audio core 306, which stores the data in a memory device 304.

FIGS. 4, 5, 6, and 7 illustrate example processes for reducing energy usage with a low power sensor core in accordance with one or more embodiments. The illustrated processes are carried out at least in part by a computing device, such as the computing device 102 of FIG. 1 or FIG. 2, or the computing device 300 of FIG. 3, and can be implemented in software, firmware, hardware, or combinations thereof. The illustrated processes are shown as a set of acts and are not limited to the order shown for performing the operations of the various acts. The illustrated processes are example processes for reducing energy usage with a low power sensor core; additional discussions of reducing energy usage with a low power sensor core are included herein with reference to different figures.

Figure 4:
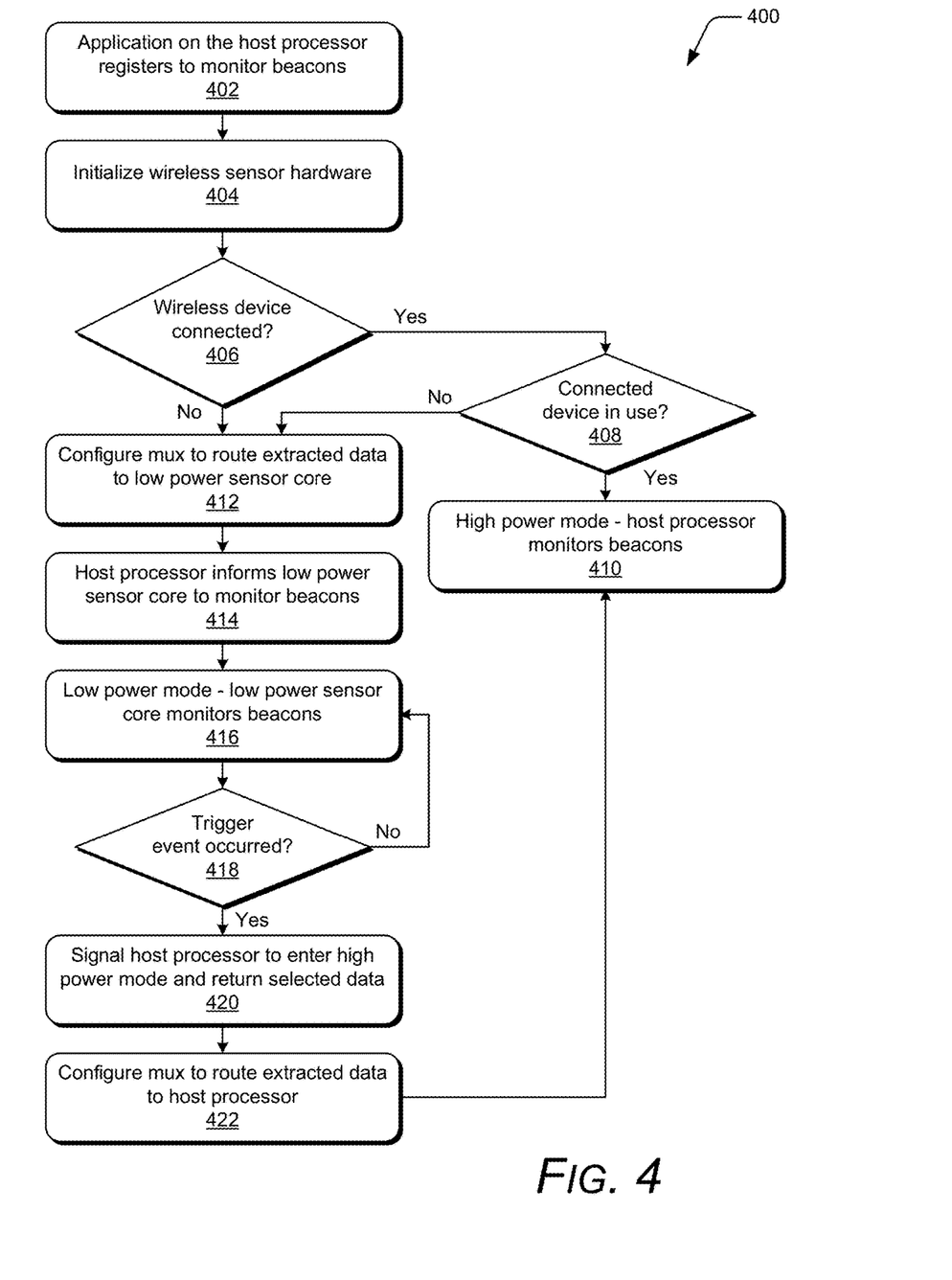
FIGS. 4, 5, 6, and 7 illustrate example processes for reducing energy usage with a low power sensor core in accordance with one or more embodiments.

FIG. 4 illustrates an example process 400 for monitoring wireless beacons for tracking the location of the computing device implementing process 400.

In process 400, an application running on the host processor registers or otherwise requests to monitor beacons (act 402). Beacons refer to wireless beacons, which are wireless devices as discussed above. The application can use the data received from wireless beacons in any of a variety of different manners, such as to display a map indicating to a user of the computing device where he or she is located, to notify the user that he or she has reached a particular place, and so forth.

The wireless sensor hardware on the computing device, if not already initialized, is initialized (act 404). This initialization is performed by, for example, the host processor. This initialization includes activating the wireless sensor hardware to receive wireless signals, optionally including waking the wireless sensor hardware from a sleep mode.

The host processor checks whether a wireless device is connected to the computing device (act 406). A wireless device being connected to the computing device refers to a wireless device being within range of the computing device, and the wireless device and computing device both being able to (e.g., configured to) communicate with each other (e.g., the wireless device is turned on, the wireless device and computing device are both configured with the appropriate parameters to communicate with one another, and so forth). For example, a wireless device that is within range of and currently paired with the computing device is connected to the computing device.

If the wireless device is connected to the computing device, then the host processor checks whether the wireless device is in use by the computing device (act 408). A wireless device is in use by the computing device if the computing device is currently within wireless communication range of the wireless device and a program of the computing device is currently sending data to and/or receiving data from the wireless device (or has sent data to and/or received data from the wireless device within a threshold amount of time, such as 30 seconds).

If a wireless device is connected to the computing device and in use by the computing device, then the processor system operates in the high power mode (act 410), and the host processor monitors beacons. Responsibility for monitoring beacons is not transferred to the low power sensor core because the host processor is already running one or more programs and expending power communicating with at least one wireless device.

However, if the wireless device is not connected to the computing device, or a connected wireless device is not in use, then the host processor begins operations to transition to the low power mode. The host processor configures the multiplexer to route data extracted from wireless signals to the low power sensor core (412). The host processor also informs the low power sensor core to monitor beacons (act 414), which includes providing parameters regarding monitoring data embedded in wireless signals from the wireless device, one or more trigger events, and so forth as discussed above. Informing the low power sensor core to monitor beacons also includes signaling the low power sensor core that the processor system is entering the low power mode, which can be done in a variety of different manners as discussed above, such as by asserting an interrupt signal line.

The processor system then enters the low power mode (act 416), and the low power sensor core monitors beacons. The low power sensor core continues to monitor the beacons and check whether a trigger event occurs (act 418). The low power sensor core can monitor for any of a variety of different trigger events as indicated by the host processor. For example, a trigger event can be an event determined based on data from a MEMS sensor, such as a particular distance that the computing device has moved or traveled, a change in direction of movement of the computing device, a change in elevation of the computing device, and so forth. By way of another example, a trigger event can be an event corresponding to particular data received from a beacon, such as a particular URL received from a beacon, particular location information received from a beacon, and so forth.

If the trigger event does not occur, the low power sensor core continues to monitor the beacons and check whether a trigger event occurs. However, in response to the trigger event occurring, the low power sensor core signals the host processor to enter the high power mode and returns selected data to the host processor (act 420). The host processor can be signaled to enter the high power mode in a variety of different manners as discussed above, such as by asserting an interrupt signal line. As discussed above, the data returned can be data received by the low power sensor core from beacons and/or data received from one or more MEMS sensors. The returned data can optionally be a result of analysis or processing by the low power sensor core as discussed above.

In response to the signal from the low power sensor core, the host processor configures the multiplexer to route data extracted from wireless signals to the host processor (422). The processor system then operates in the high power mode (act 410), and the host processor monitors beacons.

Figure 5:
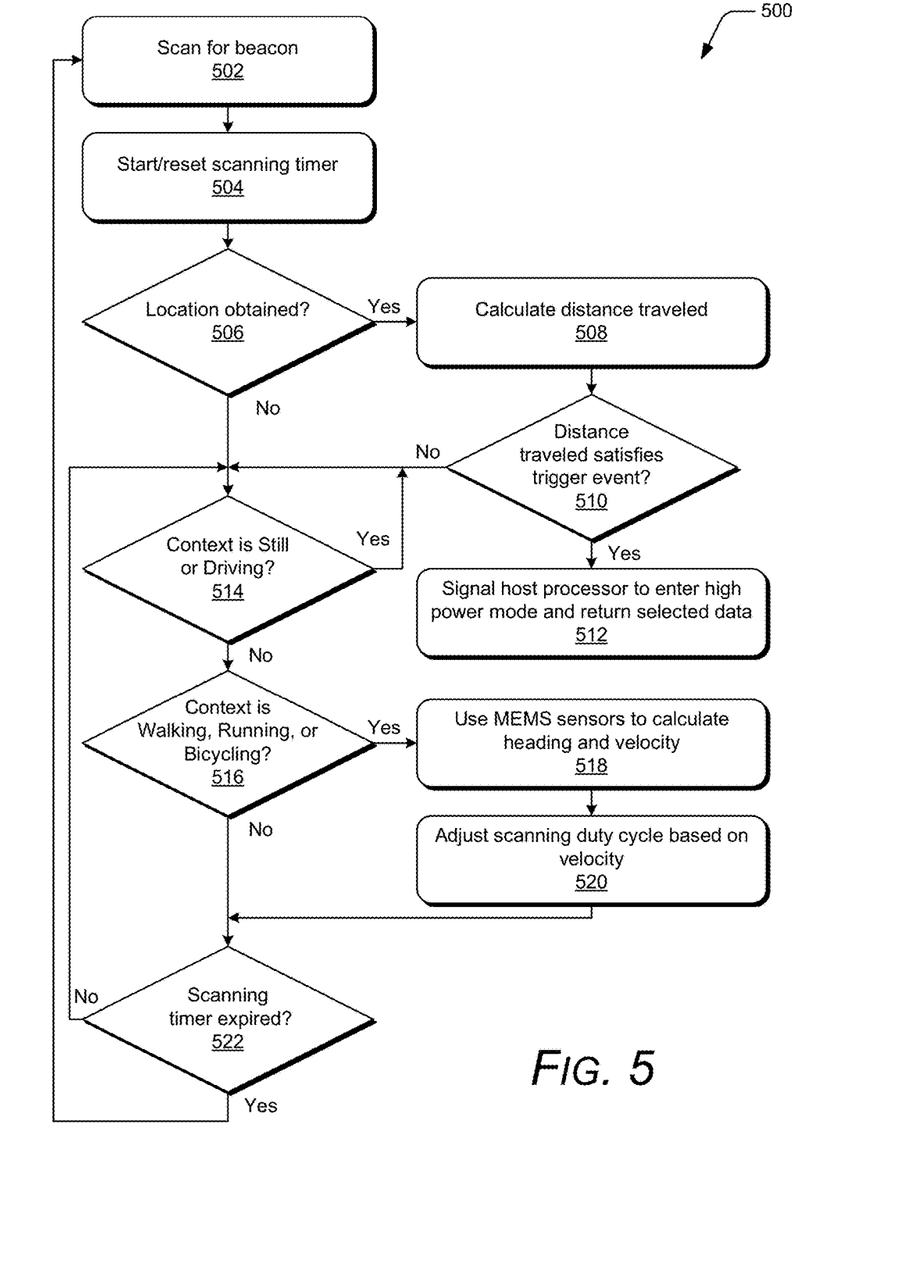

FIG. 5 illustrates an example process 500 for using contextual awareness to adjust the monitoring of wireless devices. The process 500 can provide more accurate determinations of when scanning for a wireless device (e.g., a beacon) is desired, and reduce power consumption by reducing the rate at which scanning is performed. In one or more embodiments, the process 500 is performed by the low power sensor core as part of monitoring beacons in act 416 of FIG. 4.

In process 500, the low power sensor core scans for a wireless beacon (act 502). Scanning for the wireless beacon refers to activating the wireless sensor hardware to listen for a wireless signal (e.g., at an appropriate one or more frequencies) from a wireless beacon. If a wireless beacon is detected, the low power sensor core extracts the location data embedded in the wireless signal from the wireless signal.

A scanning timer is started (act 504). The scanning timer is a timer indicating when the next scan for a beacon is to be made, and each time the scanning timer expires in act 522 discussed below, another scan for a beacon is made (act 502). After performing a scan, the scanning timer is reset and started in act 504.

A check is made as to whether a location is obtained (act 506). If no wireless beacon is detected in act 502, then no location is obtained. However, if a wireless beacon is detected in act 502, then if the wireless signal includes location data then a location is obtained, otherwise a location is not obtained.

If a location is obtained, the distance traveled by the computing device including the low power sensor core is calculated (act 508). This distance is relative to some seed or initial location, such as a seed or initial distance provided by the host processor to the low power sensor core as part of the configuration parameters (e.g., in at 414 of FIG. 4). The low power sensor core checks whether the distance traveled satisfies the trigger event (act 510). The trigger event is provided by the host processor to the low power sensor core as part of the configuration parameters (e.g., in at 414 of FIG. 4), and is a threshold distance that the computing device is to have traveled or moved. If the distance traveled satisfies the trigger event, the low power sensor core signals the host processor to enter the high power mode and returns selected data to the host processor (act 512). In one or more embodiments, acts 510 and 512 of FIG. 5 are acts 418 and 420, respectively, of FIG. 4.

However, if the distance traveled does not satisfy the trigger event, or if a location is not obtained, a check is made as to whether the current context of the computing device including the low power sensor core is Still or Driving (act 514). The current context of the computing device is determined by one or more programs run by the low power sensor core using data obtained from the MEMS sensors 118. Various different public and/or proprietary algorithms can be applied to the data obtained from the MEMS sensors 118 to determine whether the computing device is moving at a rate of speed that would correspond to a user with the computing device being Still (e.g., not moving or moving at less than a threshold rate), Driving (being in or on a motorized vehicle, such as a train, plane, car, bus, motorcycle, and so forth), Walking, Running, or Bicycling.

For example, four threshold values can be set, a small threshold value (e.g., 1 foot per second), a low-medium threshold value (e.g., 4 feet per second), a high-medium threshold value (e.g., 10 feet per second), and a large threshold value (e.g., 50 feet per second). If the data from the MEMS sensors 118 indicates that the user (and thus the user's computing device) is moving at a rate less than the small threshold value, then the context of the computing device is Still. If the data from the MEMS sensors 118 indicates that the user is moving at a rate greater than the small threshold value but less than the low-medium threshold value, then the context of the computing device is Walking. If the data from the MEMS sensors 118 indicates that the user is moving at a rate greater than the low-medium threshold value but less than the high-medium threshold value, then the context of the computing device is Running If the data from the MEMS sensors 118 indicates that the user is moving at a rate greater than the high-medium threshold value but less than the large threshold value, then the context of the computing device is Bicycling. If the data from the MEMS sensors 118 indicates that the user is moving at a rate greater than the large threshold value, then the context of the computing device is Driving.

If the context of the computing device is Still or Driving in act 514, then the low power sensor core continues to check the context of the computing device. For example, the low power sensor core assumes that if the user is still (the Still context) that the result of scanning for a beacon will not change because the user hasn't moved, so the low power sensor core does not expend the power to scan for a beacon. For example, the low power sensor core assumes that if the user is in a moving vehicle (the Driving context) that wireless beacons will not be detected (e.g., because they're typically inside buildings), so the low power sensor core does not expend the power to scan for a beacon.

If the context of the computing device is neither Still nor Driving in act 514, then a check is made as to whether the current context of the computing device including the low power sensor core is Walking, Running, or Bicycling (act 516). If the context of the computing device is Walking, Running, or Bicycling, then the low power sensor core uses data obtained from the MEMS sensors to determine the heading and velocity of the computing device (act 518). The low power sensor core adjusts the scanning duty cycle based on the determined velocity (act 520). The scanning duty cycle refers to how frequently a beacon is scanned for. The higher the velocity, the greater the frequency that the low power sensor core expects to encounter beacons, so the shorter the scanning duty cycle. For example, if the low power sensor core determines that the velocity has increased since last determined in act 518, then the scanning duty cycle is reduced, and if the velocity has decreased since last determined in act 518, then the scanning duty cycle is increased. By way of another example, the low power sensor core can maintain a table or other mapping of velocities to scanning duty cycles. The low power sensor core can adjust the scanning duty cycle to be the mapped to scanning duty cycle for the determined velocity.

If the context of the computing device is neither Walking nor Running nor Bicycling, or after the scanning duty cycle is adjusted as appropriate based on the velocity of the computing device, a check is made as to whether the scanning timer has expired (act 522). The scanning timer is reset (act 504) each time a scan for a beacon is made, and each time the scanning timer expires in act 522 another scan for a beacon is made (act 502). If the scanning timer has not expired, then the low power sensor core returns to check the context of the computing device again (act 514). The value of the scanning timer can be changed in act 520, being reduced if the scanning duty cycle is reduced, and being increased if the scanning duty cycle is increased.

It should be noted that, by continuing to check the context of the computing device in act 514 due to the context being Still or Driving, the check for whether the scanning timer expires in act 522 is postponed or delayed until the context is no longer Still or Driving. Therefore, the context being Still or Driving operates to pause scanning for the beacon.

Thus, using process 500, the context of the computing device that includes the low power sensor core alters the rate at which the wireless sensor hardware scans for beacons. By reducing the rate when appropriate, the amount of energy expended in scanning for beacons is reduced without adversely affecting the accuracy of the location information obtained by the low power sensor core. By increasing the rate when appropriate, the accuracy of the location information obtained by the low power sensor core is increased.

Figure 6:
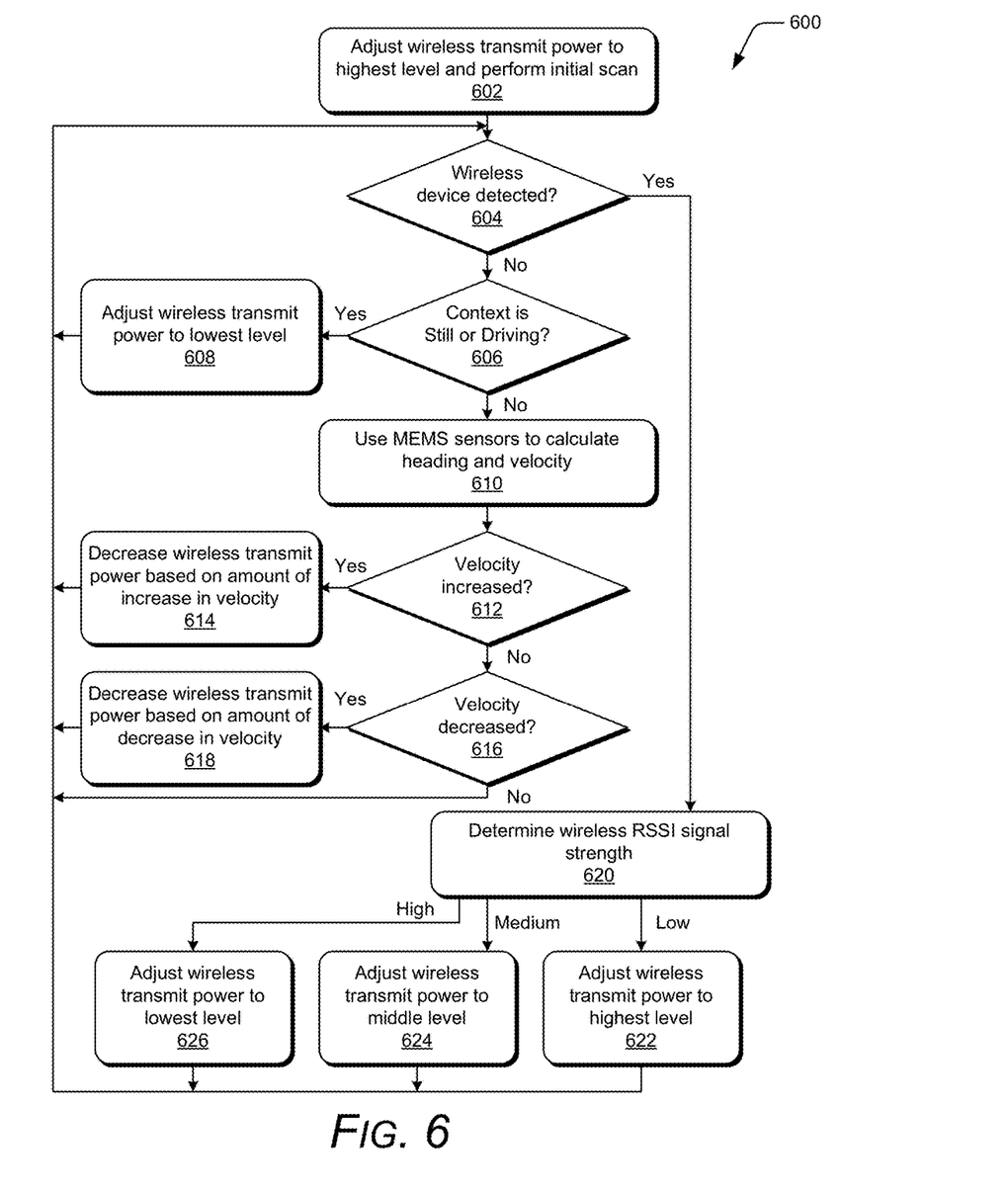

FIG. 6 illustrates another example process 600 for using contextual awareness to adjust the monitoring of wireless devices. The process 600 can reduce the amount of energy expended in scanning for a wireless device (e.g., a beacon) by reducing a transmit power based on the context of the computing device. In one or more embodiments, the process 600 is performed by the low power sensor core as part of monitoring beacons in act 416 of FIG. 4. The process 600 can be performed with or without the process 500 of FIG. 5.

In process 600, the low power sensor core adjusts the wireless transmit power for the wireless sensor hardware to a highest level and performs an initial scan for a wireless beacon (act 602). Scanning for the wireless beacon refers to activating the wireless sensor hardware to listen for a wireless signal (e.g., at an appropriate one or more frequencies) from a wireless beacon. The wireless sensor hardware can scan at various different wireless transmit powers, with higher transmit powers corresponding to larger energy consumption and longer ranges than lower transmit powers.

A check is made as to whether a wireless device is detected during the scanning (act 604). If a wireless device is not detected during the scanning then However, if the distance traveled does not satisfy the trigger event, or if a location is not obtained, a check is made as to whether the current context of the computing device including the low power sensor core is Still or Driving (act 606). The current context of the computing device is determined by one or more programs run by the low power sensor core using data obtained from the MEMS sensors 118 as discussed above.

If the context of the computing device is Still or Driving in act 606, then the low power sensor core adjust the wireless transmit power to the lowest level (act 608). For example, the low power sensor core assumes that if the user is still (the Still context) that the result of scanning for a beacon will not change because the user hasn't moved, so the low power sensor core reduces the wireless transmit power in order to expend a smaller amount of power on the next scan. For example, the low power sensor core assumes that if the user is in a moving vehicle (the Driving context) that wireless beacons will not be detected (e.g., because they're typically inside buildings), so the low power sensor core reduces the wireless transmit power in order to expend a smaller amount of power on the next scan. The low power sensor core then returns to check whether a wireless device is detected on the next scan (act 604) using the adjusted wireless transmit power.

However, if the context of the computing device is neither Still nor Driving in act 606, the low power sensor core uses the MEMS sensors to determine the heading and velocity of the computing device (act 610). The low power sensor core then checks whether the velocity has increased since last determined (act 612), such as the last time the heading and velocity were determined in act 610. If the velocity has increased, then the low power sensor core decreases the wireless transmit power based on the amount of the increase in velocity (act 614). For example, the low power sensor core assumes that if the velocity has increased that the chances of the computing device moving away from a wireless device are increased by an amount relative to the increase in velocity, so the low power sensor core reduces the wireless transmit power in order to expend a smaller amount of power on the next scan. The low power sensor core then returns to check whether a wireless device is detected on the next scan (act 604) using the decreased wireless transmit power.

If the velocity has not increased, the low power sensor core checks whether the velocity has decreased since last determined (act 616), such as the last time the heading and velocity were determined in act 610. If the velocity has decreased, then the low power sensor core decreases the wireless transmit power based on the amount of the decrease in velocity (act 618). For example, the low power sensor core assumes that if the velocity has decreased that the chances of the computing device coming near a wireless device are decreased by an amount relative to the decrease in velocity, so the low power sensor core reduces the wireless transmit power in order to expend a smaller amount of power on the next scan. The low power sensor core then returns to check whether a wireless device is detected on the next scan (act 604) using the decreased wireless transmit power.

Returning to act 604, if the wireless device is detected, then the signal strength of the wireless device is determined (act 620). The signal strength is, for example, a received signal strength indicator (RSSI) value for the wireless signal received from the wireless device. The low power sensor core adjusts the wireless transmit power based on the determined wireless signal strength. If the wireless signal strength is low (e.g., in a range between −100 decibels (dB) and −80 dB), the low power sensor core adjusts the wireless transmit power to the highest level (act 622) for the wireless sensor hardware (or within a threshold amount of the highest level). If the wireless signal strength is mid-level (the middle, e.g., in a range between −80 dB and −56 dB), the low power sensor core adjusts the wireless transmit power to the middle level (act 624) for the wireless sensor hardware (or within a threshold amount of the middle level). If the wireless signal strength is high (e.g., in a range between −55 dB and −40 dB), the low power sensor core adjusts the wireless transmit power to the lowest level (act 626) for the wireless sensor hardware (or within a threshold amount of the lowest level). The low power sensor core then returns to check whether a wireless device is detected on the next scan (act 604) using the adjusted wireless transmit power.

Figure 7:
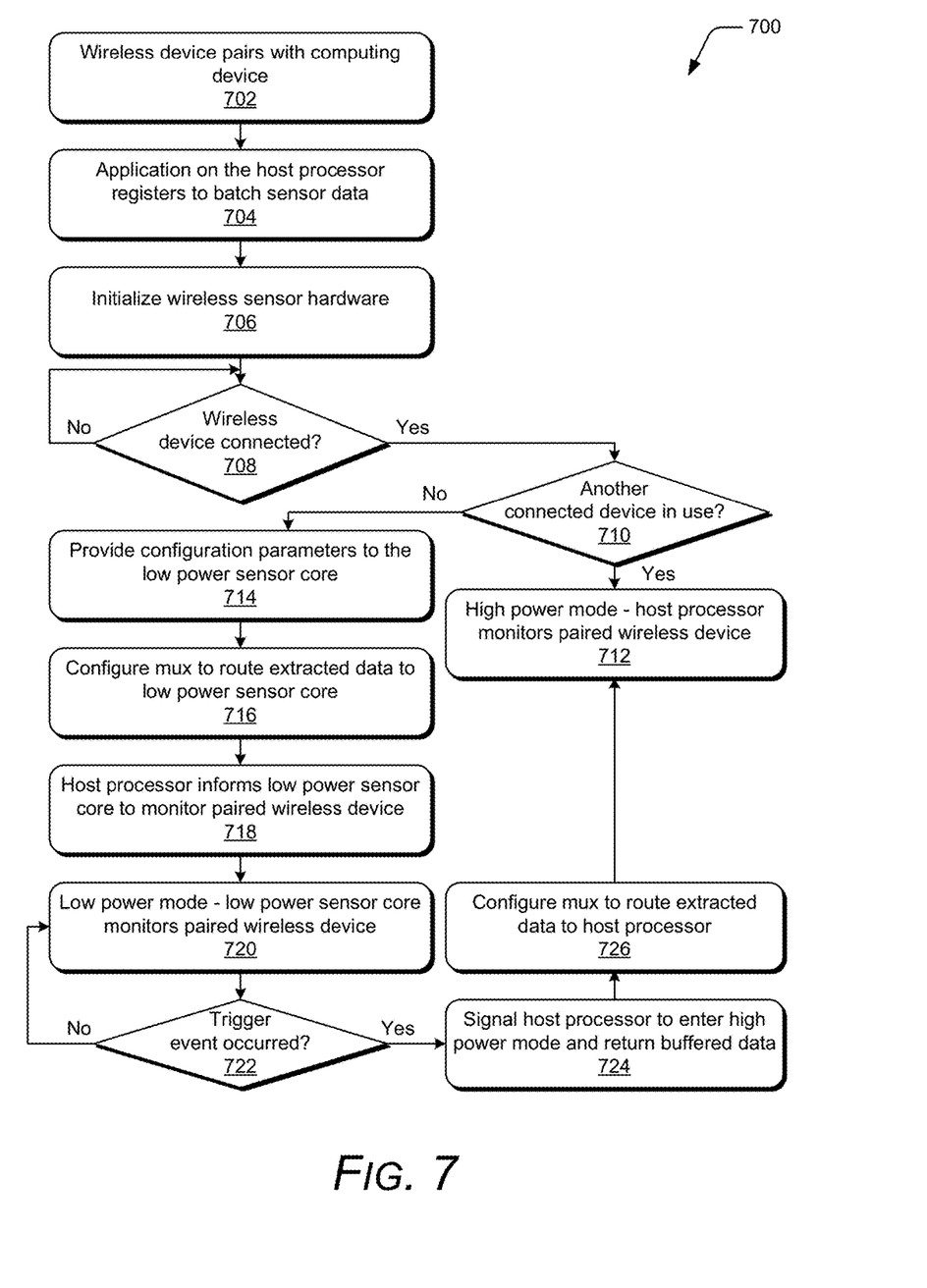

FIG. 7 illustrates an example process 700 for the computing device implementing process 700 to receive data from a wireless device that is a sensor (e.g., heart rate monitor, carbon monoxide detector).

In process 700, a wireless device pairs with the computing device (act 702). The wireless device is the sensor, and the computing device is the computing device implementing process 700. The wireless device pairing with the computing device refers to the wireless device and the computing device establishing a wireless communication coupling with one another, which optionally includes pairing credentials used by the host processor and the wireless device to securely communicate with one another.

An application running on the host processor registers or otherwise requests to batch sensor data from the paired wireless device (act 704). The sensor data is the data from the wireless sensor. The application can use the sensor data received in any of a variety of different manners, such as to display health or medical information to the user, display environment status to the user, and so forth. As part of registering for or requesting batch sensor data, the application can specify various batch parameters such as a data rate at which the sensor data is to be obtained from the wireless device, an amount of sensor data that is to be batched together (e.g., a buffer size), and so forth.

The wireless sensor hardware on the computing device, if not already initialized, is initialized (act 706). This initialization is performed by, for example, the host processor. This initialization includes activating the wireless sensor hardware to receive wireless signals, optionally including waking the wireless sensor hardware from a sleep mode.

The host processor checks whether the paired wireless device is connected to the computing device (act 708). A wireless device being connected to the computing device refers to a wireless device being within range of the computing device, and the wireless device and computing device both being able to (e.g., configured to) communicate with each other (e.g., the wireless device is turned on, the wireless device and computing device are both configured with the appropriate parameters to communicate with one another, and so forth). For example, a wireless device that is within range of and currently paired with the computing device is connected to the computing device.

If the wireless device is not connected to the computing device, then the host processor waits until the wireless device is connected to the computing device. The host processor does not monitor the wireless device because it is not connected and there would be no data being received from the wireless device.

If the wireless device is connected to the computing device, then the host processor checks whether another wireless device (other than the wireless device for which batching of sensor data is desired) is in use by the computing device (act 710). Another wireless device is in use by the computing device if the computing device is currently within wireless communication range of the other wireless device and a program of the computing device is currently sending data to and/or receiving data from the other wireless device (or has sent data to and/or received data from the wireless device within a threshold amount of time, such as 30 seconds).

If another wireless device is in use by the computing device, then the processor system operates in the high power mode (act 712), and the host processor monitors the paired wireless device. Monitoring the paired wireless device refers to receiving and storing data received from the paired wireless device. Monitoring the paired wireless device optionally includes querying the paired wireless device for sensor data at the desired data rate as indicated by the batch parameters discussed above. Responsibility for monitoring the paired wireless device is not transferred to the low power sensor core because the host processor is already running one or more programs and expending power communicating with at least one other wireless device.

However, if another wireless device is not in use, then the host processor begins operations to transition to the low power mode. The host processor provides configuration parameters to the low power sensor core to monitor the paired wireless device (act 714). The configuration parameters include the batch parameters provided by the application in act 704, such as a data rate at which the application desires to receive sensor data, an amount of sensor data that is to be batched together (e.g., a buffer size), and so forth. The configuration parameters can also include information regarding monitoring data embedded in wireless signals from the wireless device as discussed above, such as pairing credentials used by the host processor (and to be used by the low power sensor core) and the wireless device to securely communicate with one another.

The host processor configures the multiplexer to route data extracted from wireless signals to the low power sensor core (716). The host processor also informs the low power sensor core to monitor the paired wireless device (act 718).

The processor system then enters the low power mode (act 720), and the low power sensor core monitors the paired wireless device. The low power sensor core continues to monitor the paired wireless device and check whether a trigger event occurs (act 722). In one or more embodiments, the trigger event is the amount of data that is to be batched together (e.g., a buffer size) as indicated in the batch parameters discussed above being received and stored by the low power sensor core.

If the trigger event does not occur, the low power sensor core continues to monitor the paired wireless device and check whether a trigger event occurs. However, in response to the trigger event occurring, the low power sensor core signals the host processor to enter the high power mode and returns selected data to the host processor (act 724). The host processor can be signaled to enter the high power mode in a variety of different manners as discussed above, such as by asserting an interrupt signal line. The data returned is the data received from the paired wireless device. The returned data can optionally be a result of analysis or processing by the low power sensor core as discussed above.

In response to the signal from the low power sensor core, the host processor configures the multiplexer to route data extracted from wireless signals to the host processor (726). The processor system then operates in the high power mode (act 712), and the host processor monitors the paired wireless device.

Although embodiments of techniques for user interface adaptation based on detected user location have been described in language specific to features or methods, the subject of the appended claims is not necessarily limited to the specific features or methods described. Rather, the specific features and methods are disclosed as example implementations of techniques for user interface adaptation based on detected user location.

What is claimed is:

1. A computing device comprising:
a host processor;
a low power sensor core coupled to the host processor;
wireless sensor hardware;
a multiplexer;
the host processor operative to configure, in response to determining that the host processor is to enter a low power mode, the multiplexer to route data from the wireless sensor hardware to the low power sensor core rather than the host processor; and
the low power sensor core operative to receive the data, via the multiplexer, from the wireless sensor hardware while the host processor is in the low power mode, and configured to:
determine a context of the computing device;
pause scanning for a wireless beacon in response to the context of the computing device being still or being at a first speed; and
signal the host processor to enter a high power mode in response to detecting a trigger event.

2. The computing device as recited in claim 1, the host processor further operative to configure, in response to being signaled to enter the high power mode, the multiplexer to route the data from the wireless sensor hardware to the host processor rather than the low power sensor core.

3. The computing device as recited in claim 1, the host processor including multiple cores that, while executing instructions, consume more power than the low power sensor core.

4. The computing device as recited in claim 1, the wireless sensor hardware comprising hardware configured to receive Bluetooth Low Energy wireless signals, and the data comprising data embedded in the received wireless signals.

5. The computing device as recited in claim 1, the trigger event comprising a threshold distance moved by the computing device, the host processor being further operative to provide an indication of the threshold distance to the low power sensor core prior to entering the low power mode.

6. The computing device as recited in claim 1, the trigger event comprising a particular uniform resource locator being received from a wireless beacon, the host processor being further operative to provide an indication of the particular uniform resource locator to the low power sensor core prior to entering the low power mode.

7. The computing device as recited in claim 1, the trigger event comprising an amount of data that is to be batched together having been received by the low power sensor core from a wireless device, the host processor being further operative to provide an indication of the amount of data to the low power sensor core prior to entering the low power mode.

8. The computing device as recited in claim 1, the low power sensor core being further configured to:
scan, using the wireless sensor hardware, for a wireless beacon;
determine, in response to a wireless device being detected, a wireless signal strength of the detected wireless beacon; and
adjust a wireless transmit power of the wireless sensor hardware based on the wireless signal strength of the detected wireless beacon, the adjusting including increasing the wireless transmit power in response to the wireless signal strength of the detected wireless beacon being in a low range, and decreasing the wireless transmit power in response to the wireless signal strength of the detected wireless beacon being in a high range.

9. A computing device comprising:
a low power sensor core; and
a computer-readable storage medium having stored thereon multiple instructions that, responsive to execution by the low power sensor core, cause the low power sensor core to perform acts comprising:
determining a context of the computing device;
pausing scanning for a wireless beacon in response to the context of the computing device being still;
pausing scanning for a wireless beacon in response to the context of the computing device being driving;
adjusting a scanning duty cycle for a wireless beacon in response to the context of the computing device being walking; and
adjusting the scanning duty cycle for a wireless beacon in response to the context of the computing device being running.

10. The computing device as recited in claim 9, the computing device further comprising Microelectromechanical Systems (MEMS) sensors, and the determining comprising determining the context of the computing device based on data received from the MEMS sensors.

11. The computing device as recited in claim 9, the acts further comprising:
determining, based on the MEMS sensors, a rate at which the computing device is moving;
determining that the context of the computing device is still in response to the rate being less than a first threshold value;

determining that the context of the computing device is walking in response to the rate being greater than the first threshold value but less than a second threshold value;
determining that the context of the computing device is running in response to the rate being greater than the second threshold value but less than a third threshold value;
determining that the context of the computing device is bicycling in response to the rate being greater than the third threshold value but less than a fourth threshold value;
determining that the context of the computing device is driving in response to the rate being greater than the fourth threshold value; and
adjusting the scanning duty cycle for a wireless beacon in response to the context of the computing device being running.

12. The computing device as recited in claim 9, the acts further comprising:
determining a velocity of the computing device;
maintaining a mapping of velocities to scanning duty cycles; and
the adjusting comprising changing the scanning duty to the mapped to scanning duty cycle based on the velocity of the computing device.

13. The computing device as recited in claim 9, the acts further comprising:
maintaining the determining, pausing, and adjusting until a distance traveled by the computing device satisfies a threshold distance; and
signaling, to a host processor of the computing device in response to the distance traveled by the computing device satisfying the threshold distance, to enter a high power mode in which scanning for the wireless beacon is performed by the host processor rather than the low power sensor core.

14. A method implemented in a computing device, the method comprising:
scanning, using wireless sensor hardware, for a wireless device;
determining a context of the computing device;
pausing scanning for the wireless device in response to the context of the computing device being still;
pausing scanning for the wireless device in response to the context of the computing device being driving;
adjusting a scanning duty cycle for the wireless device in response to the context of the computing device being walking;
adjusting the scanning duty cycle for the wireless device in response to the context of the computing device being running;
adjusting the scanning duty cycle for the wireless device in response to the context of the computing device being bicycling;
determining, in response to a wireless device being detected, a wireless signal strength of the detected wireless device; and
adjusting a wireless transmit power of the wireless sensor hardware based on the wireless signal strength of the detected wireless device, the adjusting including increasing the wireless transmit power in response to the wireless signal strength of the detected wireless device being in a low range, and decreasing the wireless transmit power in response to the wireless signal strength of the detected wireless device being in a high range.

15. The method as recited in claim 14 further comprising:
adjusting the wireless transmit power of the wireless sensor hardware based on the context of the computing device.

16. The method as recited in claim 15, the adjusting the wireless transmit power of the wireless sensor hardware based on the context of the computing device comprising:
adjusting the wireless transmit power of the wireless sensor hardware to within a threshold amount of a lowest level in response to the context of the computing device being still; and
adjusting the wireless transmit power of the wireless sensor hardware to within the threshold amount of the lowest level in response to the context of the computing device being driving.

17. The method as recited in claim 14 further comprising:
determining a velocity of the computing device;
adjusting the wireless transmit power of the wireless sensor hardware based on the velocity of the computing device.

18. The method as recited in claim 14, the method being implemented by a low power sensor core in the computing device, the method further comprising:
maintaining the scanning, determining, and adjusting until a trigger event occurs; and
signaling, to a host processor of the computing device in response to the trigger event occurring, to enter a high power mode in which scanning for the wireless device is performed by the host processor rather than the low power sensor core.

19. The computing device as recited in claim 1, the low power sensor core being further configured to:
adjust a scanning duty cycle for a wireless beacon in response to the context of the computing device being at least one other speed different than the first speed, wherein said at least one other speed comprises a plurality of speeds different from the first speed.

20. The computing device as recited in claim 19 wherein the context of the computing device comprises walking, running, or bicycling.

* * * * *